(12) United States Patent
Lillevold

(10) Patent No.: US 7,054,500 B1
(45) Date of Patent: May 30, 2006

(54) VIDEO COMPRESSION AND DECOMPRESSION SYSTEM WITH POSTFILTER TO FILTER CODING ARTIFACTS

(75) Inventor: Karl Lillevold, Seattle, WA (US)

(73) Assignee: REALNETWORKS, Inc., Seattle, WA (US)

( * ) Notice: Subject to any disclaimer, the term of this patent is extended or adjusted under 35 U.S.C. 154(b) by 365 days.

(21) Appl. No.: 09/731,474

(22) Filed: Dec. 6, 2000

(51) Int. Cl.
*G06K 9/40* (2006.01)

(52) U.S. Cl. ............ 382/260; 382/233; 382/107; 708/300

(58) Field of Classification Search ........ 382/260, 382/210, 261, 262, 275, 233, 107, 236, 232, 382/239, 270; 333/165–212; 359/885–892; 455/213, 286, 307, 339; 708/300; 348/610; 725/151; 378/98.2; 375/240.29
See application file for complete search history.

(56) References Cited

U.S. PATENT DOCUMENTS

| | | | |
|---|---|---|---|
| 5,787,203 A | | 7/1998 | Lee et al. |
| 5,802,218 A | | 9/1998 | Brailean |
| 6,014,181 A | | 1/2000 | Sun |
| 6,037,986 A | | 3/2000 | Zhang et al. |
| 6,157,396 A | * | 12/2000 | Margulis et al. ............ 345/506 |
| 6,178,205 B1 | * | 1/2001 | Cheung et al. ........ 375/240.29 |
| 6,269,484 B1 | * | 7/2001 | Simsic et al. ................ 725/151 |
| 6,314,160 B1 | * | 11/2001 | Dhawale et al. ........... 378/98.2 |
| 6,466,624 B1 | * | 10/2002 | Fogg ..................... 375/240.27 |
| 6,539,060 B1 | * | 3/2003 | Lee et al. .............. 375/240.29 |
| 6,665,346 B1 | * | 12/2003 | Lee et al. .............. 375/240.29 |
| 6,668,018 B1 | * | 12/2003 | Pearlstein et al. ...... 375/240.12 |
| 2001/0053186 A1 | * | 12/2001 | Nakaya .................. 375/240.25 |
| 2002/0063807 A1 | * | 5/2002 | Margulis ..................... 348/745 |

OTHER PUBLICATIONS

ITU Telecommunications Standardization Sector, Study Group 16, Thomas R. Gardos, Viceo Codec Test Model, Near-Term, Version 8 (TMN8) Release 0, Portland, pp. 24-27, Jun. 1997.
Digital Multimedia Standards Series, Haskell, et al., Digital Video: An Introduction to MREG-2, pp. 156-182, 1997.

* cited by examiner

*Primary Examiner*—Barry Choobin
(74) *Attorney, Agent, or Firm*—Steven C. Stewart

(57) ABSTRACT

A video compression and decompression system has an input to receive an encoded video sequence and an output for a decoded video sequence. A video decoder is coupled to the input and decode the received encoded video sequence. A filter module is coupled to the video decoder and the output and filters the decoded video sequence from the video decoder. The filter module has a variable filter strength that is a function of detected motion activity within the video sequence. The filter module filters coding artifacts, such as mosquito artifacts and blocking artifacts from the decoded video sequence so that the displayed video is more pleasing for a viewer's eyes.

19 Claims, 4 Drawing Sheets

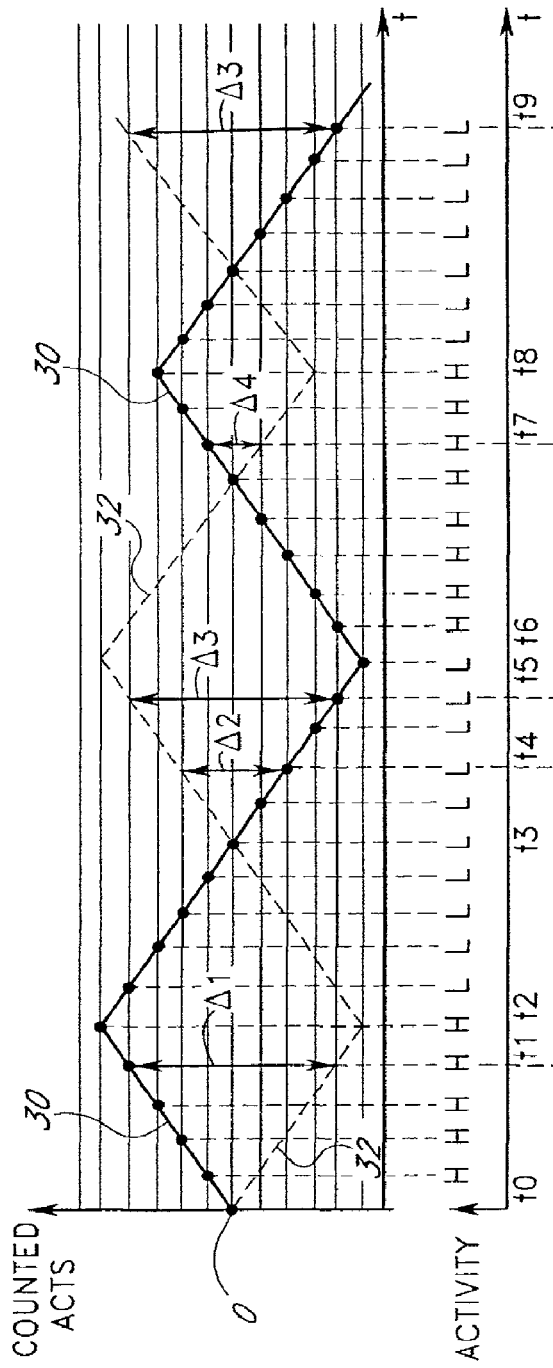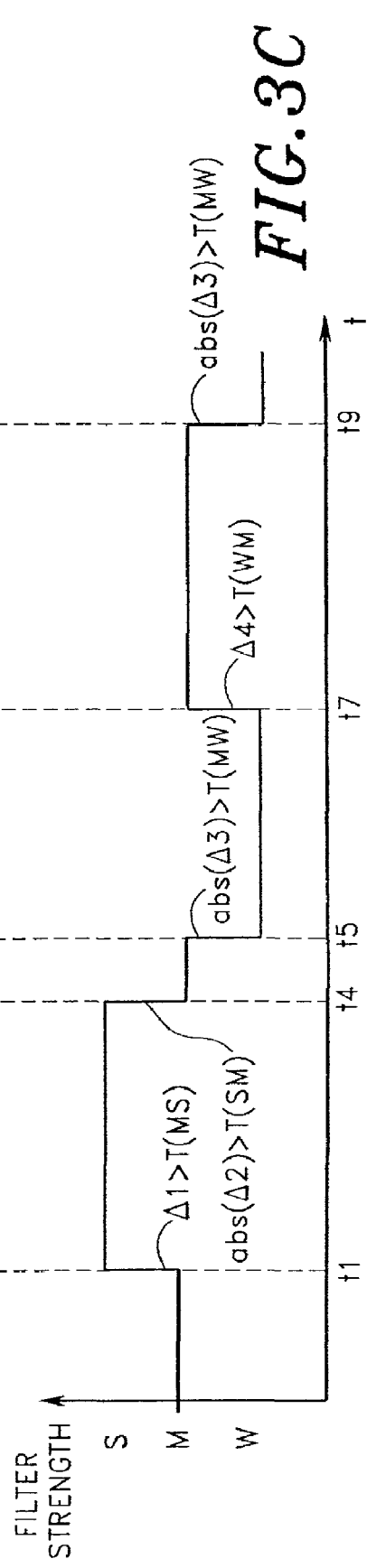

VIDEO COMPRESSION AND DECOMPRESSION SYSTEM WITH POSTFILTER TO FILTER CODING ARTIFACTS

BACKGROUND OF THE INVENTION

1. Field of the Invention

The invention pertains to the field of video compression and decompression systems. More particularly, the invention pertains to a system and method for reducing compression artifacts in a video compression and decompression system.

2. Description of the Related Art

Systems for applications of video and visual communications transmit, process and store large quantities of video data. To create a video presentation, such as a video movie, a rendering video system displays the video data as a sequence of individual digital images, also referred to as "frames," thereby simulating movement. In order to achieve a video presentation with an acceptable video quality, or to enable transmission and storage at all, the video systems process and modify the video data prior to transmission or storage. For instance, the video data is compressed and encoded to reduce the bit rate and the required bandwidth for storage and transmission of the images.

In a conventional video system a video encoder is used to compress and encode the video data and a video decoder is used to decompress and to decode the video data. The video encoder outputs video data that has a reduced bit rate and a reduced redundancy. That is, the technique of video compression removes spatial redundancy within a video frame or temporal redundancy between consecutive video frames. In accordance with known image compression standards, such as MPEG, MPEG-2 and JPEG, an image coding process typically includes performing a block based frequency transform, e.g., discrete cosine transform (DCT), on an image to be transmitted. The resulting DCT coefficients are quantized or mapped to different quantization steps to render an approximate representation thereof. If the available transmission bandwidth is relatively small, with respect to the complexity of the image to be transmitted, the size of the quantization steps needs to be relatively large. In that case, the resulting coarse quantization of the DCT coefficients introduces coding artifacts into the transmitted image and severely degrades the visual quality of the decoded sequence that may be displayed.

Examples of such artifacts include mosquito artifacts and blocking artifacts. Mosquito artifacts are defined as temporarily nonstationary impulses that appear around objects which are moving within a decompressed video sequence. The mosquito artifacts result from the coarse quantization of a prediction error signal. The majority of the energy contained in the prediction error signal is the result of a motion estimator's inability to distinguish between differently moving objects within the video sequence. For example, in videoconferencing applications the subject is generally against a stationary background. Since the motion estimator tries to match blocks of pixels between temporarily adjacent frames, the boundaries between moving objects and stationary background that fall within these blocks cannot be detected. This leads to a situation where either a part of the background is assumed to be moving, or a part of the moving object is assumed to be stationary. If these prediction errors are coarsely quantized, impulsive artifacts result that change over time and tend to swarm around the moving object, similar to a mosquito.

Blocking artifacts are defined as the introduction of artificial block boundaries into the decoded video sequence. These artifacts are due to the combination of quantization and dividing the prediction error signal into blocks. That is, since there exists an inverse relationship between spatial extent and frequency extent analogous to the inverse relationship that exists between time and frequency extent in Fourier analysis, the quantization errors that occur in the DCT domain are smeared across the corresponding spatial block. Furthermore, since each block is quantized separately, the errors are most visible at the block boundaries.

In order to reduce the effects of the coding artifacts, it is known to apply a postprocessing technique to the recovered image. Since the artifacts typically comprise high frequency components, decoders in systems that apply such postprocessing include a postprocessor having a low-pass filter to filter out those components in the recovered image. However, the quality of the postprocessed image is dependent upon the selected parameters and may drastically vary from one set of parameters to another.

Other systems use postprocessing filters that are spatially adaptive. These spatially adapted filters rely on local signal estimates and local noise power estimates to alter their responses. However, such an estimation of the noise power based on the quantization step size is not a reliable indicator as to the spatial location of mosquito artifacts and blocking artifacts within the decompressed video. For example, over-smoothing or blurring of the decompressed video occurs due to inaccurate estimates of the compressed video's signal-to-noise ratio.

Thus, there is a need for a video compression and decompressing system and a method which suppress mosquito and blocking artifacts to improve upon the video quality a viewer perceives.

SUMMARY OF THE INVENTION

An aspect of the present invention involves a decoder apparatus for a video compression and decompression system having an input to receive an encoded video sequence and an output for a decoded video sequence. A video decoder is coupled to the input and decodes the received encoded video sequence. A filter module is coupled to the video decoder and the output and filters a decoded video sequence from the video decoder. The filter module has a variable filter strength that is a function of detected motion activity within the video sequence.

Another aspect of the invention involves a filter module for a video compression and decompression system. The filter module has an input to receive a decoded video sequence and an output for the decoded video sequence. An activity counter determines motion activity within the decoded video sequence. A threshold detector is coupled to the activity counter and adjusts a filter strength as a function of the determined motion activity within the decoded video sequence. The threshold detector selectively adjusts the filter strength to one of a predetermined number of levels.

A further aspect of the invention involves a video compression and decompression system having an input to receive an encoded video sequence and an output for a decoded video sequence. A video decoder is coupled to the input and decodes the received encoded video sequence. A filter module is coupled to the video decoder and the output and filters a decoded video sequence from the video decoder. The filter module has a variable filter strength that is a function of detected motion activity within the video sequence.

Another aspect of the invention involves a method of filtering a decoded video sequence in a video compression and decompression system. The method receives a decoded video sequence and determines a motion activity of each frame of the decoded video sequence. The method categorizes each frame as a frame of high activity or as a frame of low activity and adjusts a filter strength of a filter to filter the decoded video sequence as a function of the motion activity.

BRIEF DESCRIPTION OF THE DRAWINGS

These and other aspects, advantages, and novel features of the invention will become apparent upon reading the following detailed description and upon reference to the accompanying drawings.

FIGS. 3A and 3B are diagrams illustrating motion activity within a video sequence as a function of time.

FIG. 3C is a flow diagram illustrating the filter strength of the postfilter module as a function of time.

DETAILED DESCRIPTION OF THE PREFERRED EMBODIMENT

In the following description, reference is made to the accompanying drawings, which form a part hereof, and which show, by way of illustration, specific embodiments in which the invention may be practiced. It is to be understood that other embodiments may be utilized and structural changes may be made without departing from the scope of the present invention. Where possible, the same reference numbers will be used throughout the drawings to refer to the same or like components. Numerous specific details are set forth in order to provide a thorough understanding of the present invention. However, it will be obvious to one skilled in the art that the present invention may be practiced without the specific details or with certain alternative equivalent devices and methods to those described herein. In other instances, well-known methods, procedures, components, and devices have not been described in detail so as not to unnecessarily obscure aspects of the present invention.

Figure 1:
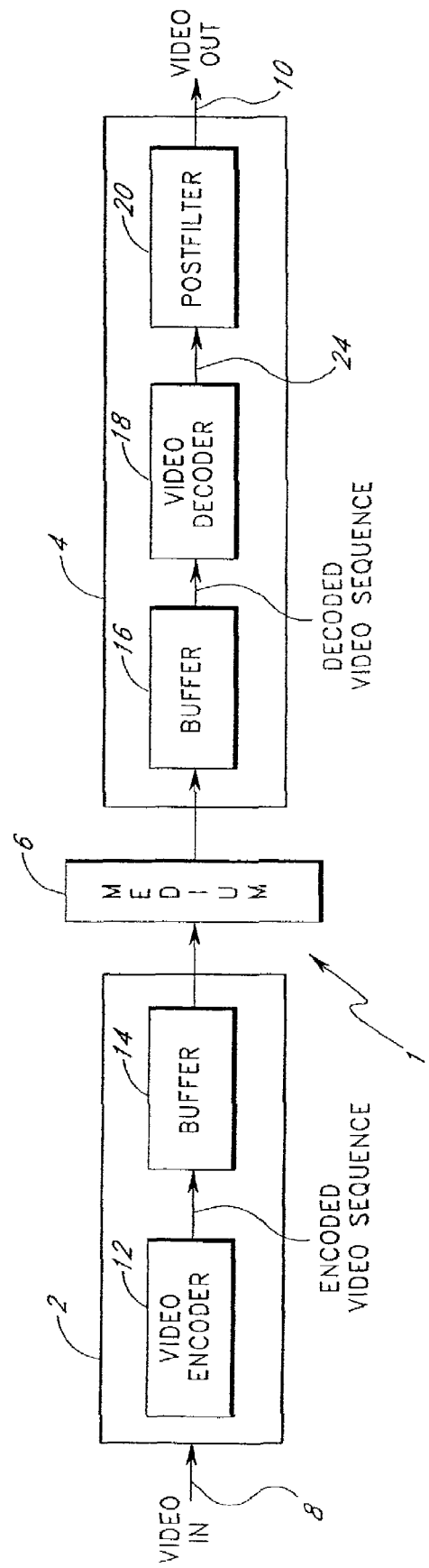
FIG. 1 is a high-level block diagram of a video compression and decompression system having an encoder apparatus and a decoder apparatus that includes a postfilter module.

FIG. 1 is a high-level block diagram of a video compression and decompression system 1 (hereinafter "video compression system 1") having an encoder apparatus 2 and a decoder apparatus 4 that is coupled to the encoder apparatus 2 through a medium 6. The encoder apparatus 3 includes a video encoder 12 and a buffer 14. The decoder apparatus 4 includes a buffer 16, a video decoder 8 and a postfilter module 20. The postfilter module 20 provides for a variable filter strength in accordance with the present invention. The filter strength varies as a function of a determined motion activity within a video sequence in order to remove coding artifacts (e.g., mosquito artifacts and blocking artifacts) as explained below in greater detail.

The encoder apparatus 2 encodes a video input sequence 8 (VIDEO IN) to generate an encoded and thus compressed representation in one of a number of possible formats. The format may be in an interleaved format tailored for "live" streaming of the encoded representation. The format may also be in a single file format in which each of the encoded representations are stored in a contiguous block within one file. This format is tailored for the "static" case in which a file is created for subsequent streaming by a server.

The video input sequence 8 to the encoder apparatus 2 may be either a live signal, e.g., provided by a video camera, or a prerecorded sequence in a number of possible formats. The video input sequence 8 includes frames of a digital video, an audio segment consisting of digital audio, combinations of video, graphics, text, and/or audio (multimedia applications), or analog forms of the aforementioned. If necessary, conversions can be applied to various types of input signals such as analog video, or previously compressed and encoded video to produce an appropriate input to the encoder apparatus 2. In one embodiment, the encoder apparatus 2 may accept video in RGB or YUV formats. The encoder apparatus 2, however, may be adapted to accept any format of input as long as an appropriate conversion mechanism is supplied. Conversion mechanisms for converting a signal in one format to a signal in another format are well known in the art.

The medium 6 may be a storage device or a transmission medium. In one embodiment, the video compression system 1 may be implemented on a computer. The encoder apparatus 2 sends an encoded video stream (representation) to the medium 6 that is implemented as a storage device. The storage device may be a video server, a hard disk drive, a CD rewriteable drive, a read/write DVD drive, or any other device capable of storing and allowing the retrieval of encoded video data. The storage device is connected to the decoder apparatus 4, which can selectively read from the storage device and decode the encoded video sequence. As the decoder apparatus 4 decodes a selected one of the encoded video sequence, it generates a reproduction of the video input sequence 8, for example, for display on a computer monitor or screen.

In another embodiment, the medium 6 provides a connection to another computer, which may be a remote computer, that receives the encoded video sequence. The medium 6 may be a network connection such as a LAN, a WAN, the Internet, or the like. The decoder apparatus 4 within the remote computer decodes the encoded representations contained therein and may generate a reproduction of the video input sequence 8 on a screen or a monitor of the remote computer.

Aspects of the video compression system 1 illustrated in FIG. 1 and described above can be combined and supplemented to achieve other embodiments. Numerous other implementations are consistent with the scope of this invention. Such other implementations need not be restricted to video, but may include audio or other forms of media as well.

The video encoder 12 performs, for example, a discrete cosine transform (DCT) to encode and compress the video sequence 8. Briefly, the video encoder 12 converts the video input sequence 8 from the time domain into the frequency domain. The output of the video encoder 12 is a set of signal amplitudes, for example, called "DCT coefficients" or transform coefficients. A quantizer receives the DCT coefficients and assigns each of a range (or step size) of DCT coefficient values a single value, such as a small integer, during encoding. Quantization allows data to be represented more compactly, but results in the loss of some data. Quantization on a finer scale results in a less compact representation (higher bit-rate), but also involves the loss of less data. Quantization on a more coarse scale results in a more compact representation (lower bit-rate), but also involves more loss of data.

The pre-existing video encoding techniques typically break up a frame (picture) into smaller blocks of pixels called macroblocks. Each macroblock can consist of a matrix of pixels, typically a 16×16 matrix, defining the unit of information at which encoding is performed. The matrix of pixels is therefore referred to as a 16×16 macroblock. These video encoding techniques usually break each 16×16 macroblock further up into smaller matrices of pixels. For example, into 8×8 matrices of pixels or 4×4 matrices of pixels. Such matrices are hereinafter referred to as subblocks. In one embodiment of the present invention, a 16×16 macroblock is divided into 4×4 subblocks. Those skilled in the art will appreciate that the present invention is equally applicable to systems that use 8×8 subblocks, 4×4 subblocks or only 16×16 marcoblocks without breaking it up into subblocks.

Further, the pre-existing encoding techniques provide for motion compensation and motion estimation using motion vectors. The motion vectors describe the direction, expressed through an x-component and a y-component, and the amount of motion of the 16×16 macroblocks, or their respective subblocks, and are transmitted to the decoder as part of the bit stream. Motion vectors are used for bidirectionally encoded pictures (B-pictures) and predicted pictures (P pictures) as known in the art.

The buffer 14 of the encoder apparatus 2 receives the encoded and compressed video sequence (hereinafter "encoded video sequence") from the video encoder 12 and adjusts the bit rate of the encoded video sequence before it is sent to the medium 6. Buffering may be required because individual video images may contain varying amounts of information, resulting in varying coding efficiencies from image to image. As the buffer 14 has a limited size, a feedback loop to the quantizer may be used to avoid overflow or underflow of the buffer 14. The bit-rate of the representation is the rate at which the representation data must be processed in order to present the representation in real time. A higher bit-rate representation of the video input sequence 8 generally comprises more data than a lower bit-rate representation of the same sequence. The most pertinent application of the bit-rate measure is in determining the rate at which the data of the representation should be streamed in order to present the representation in real time. Real-time playback of a higher bit-rate representation of a video sequence requires that the data of the representation be streamed and/or decoded at a faster rate than that required for a lower bit-rate representation of the same sequence. Thus, when streaming for real-time playback, a higher bit-rate representation requires a higher bandwidth communication link than a lower bit-rate representation.

The decoder apparatus 4 performs the inverse function of the encoder apparatus 4. The buffer 16 serves also to adjust the bit rate of the incoming encoded video sequence. The video decoder 18 decodes and decompresses the incoming video sequence reconstructing the video sequence and outputs a decoded and decompressed video sequence 24 (hereinafter "decoded video sequence 24"). In addition, the decoder apparatus 4 includes the postfilter module 20 that removes coding artifacts such as mosquito artifacts and blocking artifacts. The causes for these coding artifacts are explained above. The postfilter module 20 in accordance with the present invention reduces these artifacts without distorting the pictures which are output as a video output sequence 10. The video movie is therefore visually more pleasing for the viewers' eyes.

Figure 2:
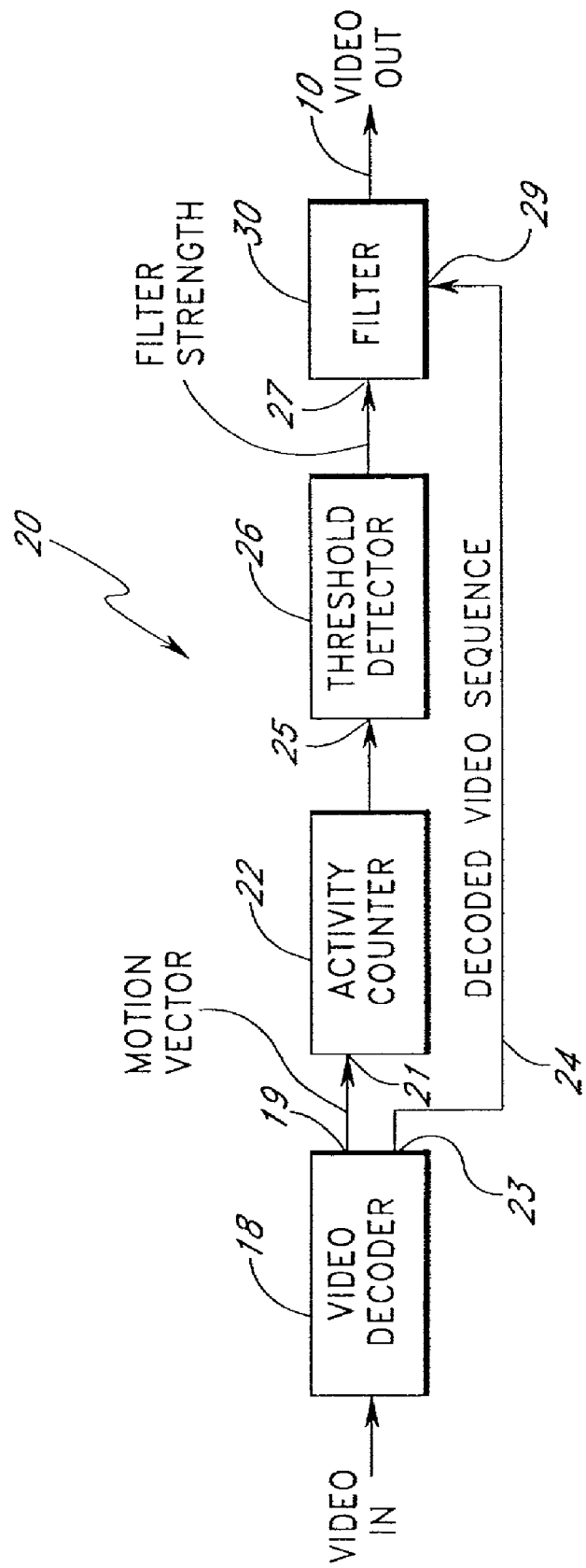
FIG. 2 shows an exemplary embodiment of the postfilter module.

FIG. 2 shows the video decoder 18 coupled to an exemplary embodiment of the postfilter module 20. The postfilter module 20 includes an activity counter 22, a threshold detector 26 and a filter 30. An output 19 of the video decoder 18 is connected to an input 21 of the activity counter 22 and an output 23 of the video decoder 18 is connected to an input 29 of the filter 30. Further, the activity counter 22 is connected to an input 25 of the threshold detector 26 which is also connected to an input 27 of the filter 30. As discussed below in more detail, the input 21 of the activity counter 22 receives a sequence of motion vectors, the input 29 of the filter 30 receives a bitstream representing the decoded video sequence and the input 21 of the filter 30 receives a filter strength control signal. The filter 30 outputs the video output sequence 10.

It is contemplated that the postfilter module 20 is divided into the activity counter 22, the threshold detector 26 and the filter 30 for illustrative purposes only. Those skilled in the art will appreciate that such a division may not be required to implement the functionality of the postfilter module 20 in accordance of the present invention. For instance, the functionality of the postfilter module 20 may be implemented using a software module or a microprocessor that incorporates the functionalities of the components (22, 26, 30) shown in FIG. 2.

The video decoder 18 receives a bit stream representing the encoded video sequence from the buffer 16 (FIG. 1). In one embodiment, the video decoder 18 is a conventional MPEG decoder that includes a decoder controller, a VLC decoder (Variable Length Coding, VLC) and a reconstruction module. The operation and function of these components are known to those skilled in the art. These components are therefore described only to the extent believed to be helpful for a complete understanding of the present invention. For a more extensive description of a MPEG decoder, reference is made to generally available MPEG documents and publications. For instance, Barry G. Haskell et at, "Digital Video: An Introduction to MPEG-2," Chapman & Hall, ISBN 0-412-08411-2, Chapter 8, pages 156-182.

The decoder controller receives the bit stream and derives control signals for the reconstruction module and the VLC decoder from the bit stream. Further, the decoder controller separates the encoded video data from the bit stream and inputs the encoded data to the VLC decoder. The decoder controller outputs control signals and status signals that include among others "block position," "frame select," "intra select" and "current picture" (not shown).

The VLC decoder obtains from the encoded video data the quantized DC coefficients. Further, the VLC decoder obtains the motion vectors of each picture and a code word indicating the mode used to encode the video sequence (e.g., bidirectionally coded pictures (B-pictures) and predicted pictures (P-pictures)). In accordance with the present invention, the motion vectors are available for the activity counter 22 at the output 19 of the video decoder 18.

The reconstruction module includes a dequantizer unit and an IDCT unit for calculating the inverse DCT. Using the encoded video data and the control signals provided by the decoder controller, the reconstruction module rebuilds each picture and, thus, creates the decoded video sequence 24 that is input to the filter 30.

The activity counter 22 receives the motion vectors from the video encoder 18 on a frame-by-frame basis. Each macroblock of a frame (e.g., a 16×16 macroblock) is further divided into subblocks, for instance, into 4×4 subblocks, wherein each 4×4 subblock includes a motion vector representing motion of the 4×4 subblock, if any. The activity counter 22 uses these motion vectors to determine whether the presently analyzed frame (picture) is a high activity frame or a low activity frame.

In one embodiment, the activity counter 26 includes a processor that analyzes these motion vectors of the subblocks. If either the differences of the x-components or the difference of the y-components of a motion vector with respect to the present subblock and the neighboring subblocks are greater than a predetermined integer the present subblock is categorized as an active subblock. That is, the predetermined integer is selected as a parameter to determine whether there is motion in the present subblock. The processor determines that there is motion when at least one of the differences (x-components, y-components) is greater than the predetermined integer. For instance, the predetermined integer is selected to be in a range between "1" and "3." In a preferred embodiment, the predetermined integer is "1." This procedure is repeated, for example, sixteen times and each 4×4 subblock is either in the active category or in the inactive category. The processor determines the number of active subblocks for each macroblock.

If the number of active subblocks is greater than a predetermined threshold number, the processor characterizes this macroblock as an active macroblock. The predetermined threshold number is selected to define when a macroblock is active. That is, when a sufficient number of subblocks is active, the macroblock is defined as active. For instance, if the macroblock is divided into 4×4 subblocks, the predetermined threshold number is four so that the macroblock is active when more than four subblocks (i.e., 25%) out of 16 subblocks are active. In other embodiments, the macroblock may be defined as active when more subblocks are active (e.g., within a range between 30% and 50%), or when less subblocks are active (e.g., within a range of 10% and 25%).

The processor counts the number of active macroblocks for the whole frame and compares the number of active macroblocks to a defined threshold value. If the number of active macroblocks is higher than the defined threshold value, the frame is a high activity frame (hereinafter "H" frame.) If the number of active macroblocks is equal to or lower than the defined threshold value, the processor characterizes the frame as a low activity frame (hereinafter "L" frame.)

The total number of macroblocks in a frame depends on the size of the video frames or the resolution of the video frames. For instance, if the resolution is 640×480, the number of macroblocks is (640/16)×(480/16)=1200. The defined threshold value may then be selected to be 300. That is, the frame is an "H" frame if more than 25% of the macroblocks are active. It is contemplated that the defined threshold value may be selected so that a frame is active when between 10% and 40% of the macroblocks are active.

For each "H" frame the processor increases a counter and for each "L" frame the processor decreases this counter. A first counter value, therefore, increases and decreases as a function of the "H" frames and the "L" frames. In one embodiment, the processor implements two counters. The first counter operates as described. The second counter, however, decreases with each "H" frame and increases with each "L" frame (FIG. 3A). A second counter value, therefore, decreases and increases as a function of the "H" frames and the "L" frames.

Those skilled in the art will appreciate that, in another embodiment, the activity counter 22 may be implemented using a processor and separate counters coupled to the processor. In yet another embodiment, the activity counter 22 may be implemented as a software module or a combination of a software module and firmware.

The threshold detector 26 is coupled to the activity counter 22 and includes in one embodiment a comparator unit (e.g., including operational amplifiers). The comparator unit receives, for example, the two counter values from the activity counter 22 and determines the difference between the two counter values. The comparator unit compares this difference to predetermined threshold values as described below with respect to FIGS. 3A, 3C. The threshold values may be determined through resistor circuits coupled to the comparator unit. In another embodiment, the threshold values may be stored in a programmable memory from which the comparator unit may read the respective threshold value.

The filter 30 is a digital filter that filters high-frequency components, such as pulses, from the decoded video sequence 24. In accordance with the present invention, the filter 30 has a variable filter strength that depends upon the motion activity within a picture. The filter strength can be adjusted by varying the filter coefficients of the filter 30. In one embodiment, the filter 30 may be adjusted to have one of a number of predetermined levels representing different filter strengths. In one embodiment, the filter 30 has three levels, Strong ("S"), Medium ("M") or Weak ("W") as shown in FIG. 3C. It is contemplated that more than three levels may be defined.

In one embodiment, the filter 30 may include or may be associated with a memory that stores the respective filter coefficients for the levels Strong, Medium and Weak. Upon the threshold detector 26 determining that the filter strength must be changed, the generated control signal (e.g., a code word corresponding to one of the levels) addresses the memory and the filter coefficients for the selected filter strength are loaded to the filter 30.

FIG. 3A is a diagram illustrating the motion activity within the video sequence 24 as determined by the activity counter 26. As the activity counter 26 determines the occurrence of "high" and "low" activities as discrete events, FIG. 3A shows two graphs 30, 32 representing these events as a continuous function of time (t). The graph 30 is shown as a solid line and the graph 32 is shown as a broken line, wherein the graph 32 is a mirror image of the graph 30 relative to a horizontal axis through an offset value O. In another illustration, the offset value O may be zero and the horizontal axis may be the X-axis. Thus, starting at the offset value O, the graph 30 increases with a predetermined rate and the graph 32 decreases with the same rate. The graphs 30, 32 intersect, for example, at t=t3, while the graph 30 is decreasing and the graph 32 is increasing. FIG. 3A further shows difference values $\Delta 1$, $\Delta 2$, $\Delta 3$, $\Delta 4$ as described below.

FIG. 3B is a diagram illustrating a sequence of frames having high and low activities as a function of time (t). A frame with a high activity is represented as "H" and a frame with a low activity is represented as "L." FIG. 3B is aligned with FIG. 3A to illustrate the increasing and decreasing graphs 30, 32 as a function of the "H" and "L" frames. The illustrated sequence of frames (from left to right) has five "H" frames, ten "L" frames, eight "H" frames and eight "L" frames. Corresponding to these activities, the graph 30 in FIG. 3A increases during a period between t=t0 and t=t2, decreases during a period between t=t2 and t=t6, increases during a period between t=t6 and t=t8 and decreases during a period between t=t8 and t=t9.

FIG. 3C is a diagram illustrating the filter strength of the postfilter module 20 as a function of time. In one embodiment, the filter strength may be set to have one of three levels Strong ("S"), Medium ("M") or Weak ("W"). The postfilter module 20 is configured so that, as a default setting, the filter strength is at the level "M." From this level "M" the filter strength may change to one of the levels "S" and "W." For example, at t=t1, the filter strength changes from the level "M" to the level "S" and at t=t4, the filter strength returns to the level "M." At t=t5, the filter strength changes from the level "M" to the level "W" and at t=t7, the filter strength returns to the level "M." At t=t9, the filter strength changes again from the level "M" to the level "W."

Figure 4:
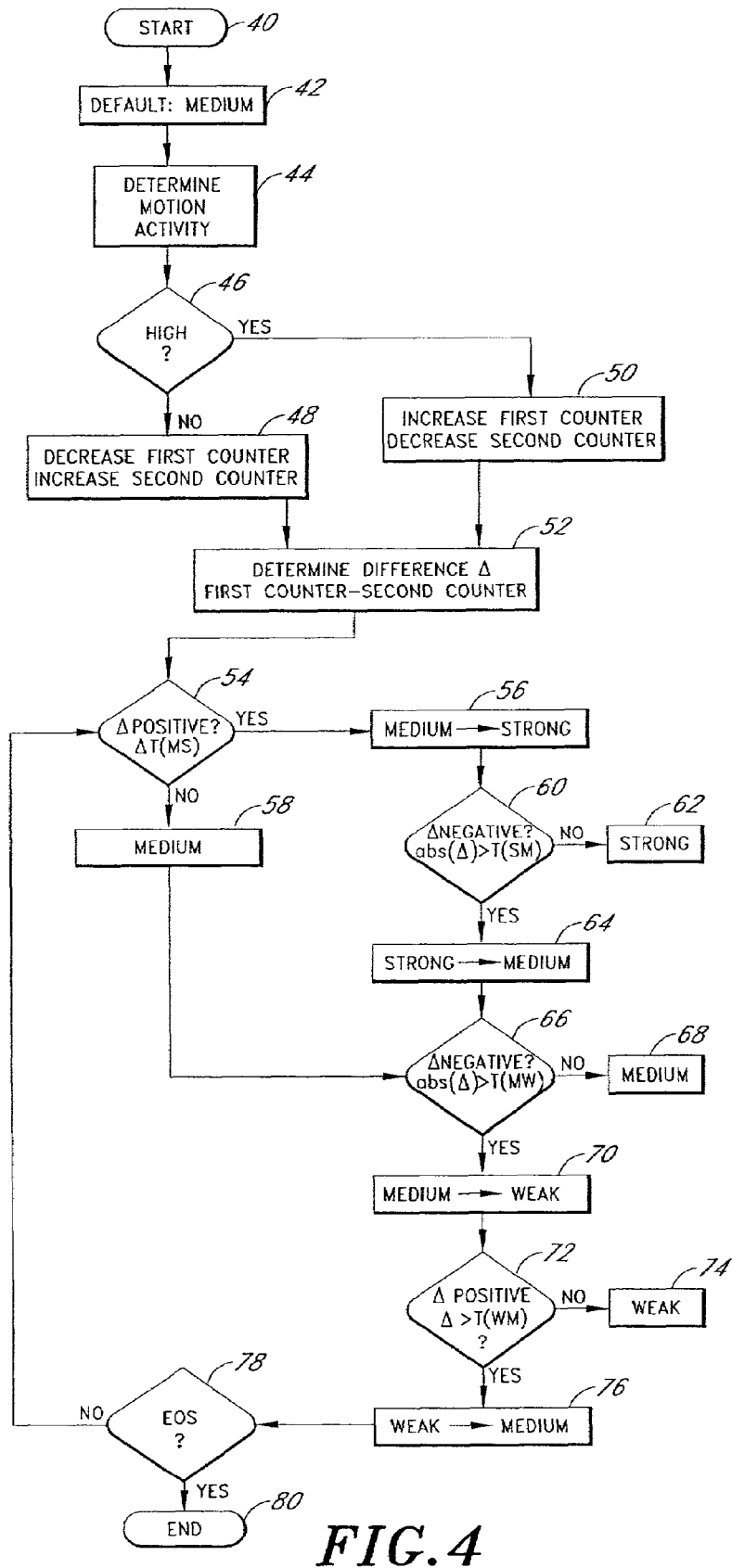
FIG. 4 is a diagram illustrating a procedure for varying the filter strength illustrated in FIG. 3C.

FIG. 4 is a flow diagram illustrating a procedure 40 for varying the filter strength illustrated in FIG. 3C. In describing the procedure, reference is made to FIGS. 2, 3A and 3B. During initialization of the procedure, the activity counter is reset to its offset value O and the filter strength is set to be at the level "M" which is in one embodiment a default level as indicated in a step 42.

Proceeding to a step 44, the procedure determines the motion activity within the sequence of frames. That is, the procedure determines whether the presently analyzed frame is a "H" frame or a "L" frame, for example, as illustrated in FIG. 3B. For each subblock within a 16×16 macroblock, the procedure looks at a present subblock and its neighboring subblocks and uses the differences of the motion vectors (x, y components) with respect to the present motion vector and the neighboring subblock to determine whether the present subblock is an active subblock or an inactive subblock This procedure is repeated sixteen times so that each subblock is either in the active category or in the inactive category.

The procedure determines the number of active subblocks for each macroblock. A comparison of the number of active subblocks with the predetermined threshold value is used to determine whether the macroblock is an active or inactive macroblock. In one embodiment, the predetermined threshold value is four. That is, if more than 25% of the 16 subblocks are in the active category the macroblock is an active macroblock. It is contemplated that the threshold value may be set at a higher number.

Proceeding to a step 46, the procedure determines the number of macroblocks for the whole frame and compares the number of active macroblocks to a defined threshold value. If the number of active macroblocks is higher than the defined threshold value, the frame is a "H" frame. In one embodiment, the defined threshold value is 25%, i.e., if the number of active macroblocks in a frame is greater than 25% of the number of macroblocks in the whole frame, the frame is an "H" frame. If it is a "H" frame, the procedure proceeds along the YES branch to a step 50, and if it is not a "H" frame, the procedure proceeds along the NO branch to a step 48.

In the step 50, for each "H" frame the procedure increases a first counter and decreases a second counter. As shown in FIG. 3A, the first counter increases during the periods between t=t0 and t=t2, t=t6 and t=t8 as shown through the increasing graph 30, and the second counter decreases during these periods as shown through the decreasing graph 32. These periods include the "H" frames as shown in FIG. 3B.

In the step 48, for each "L" frame the procedure decreases the first counter and increases the second counter. As shown in FIG. 3A, the first counter decreases during the periods between t=t2 and t=t6, t=t8 and t=t9 as shown through the decreasing graph 30, and the second counter increases during these periods as shown through the increasing graph 32. These periods include the "L" frames as shown in FIG. 3B.

Proceeding to a step 52, the procedure determines a difference A between events counted by the first counter and events counted by the second counter. FIG. 3A shows exemplary differences: a difference Δ1 is shown at t=t1, a difference Δ2 is shown at t=t4, a difference Δ3 is shown at t=t5, a difference Δ4 is shown at t=t7 and the difference Δ3 is shown again at t=t9.

Proceeding to a step 54, the procedure determines if the difference Δ is positive and if the difference Δ is greater than a threshold value T(MS). In one embodiment, the threshold value T(MS) is an integer value, for example, eight (e.g., Δ1>8). If the condition is satisfied, the procedure proceeds along the YES branch to a step 56. If the condition is not satisfied, the procedure proceeds along the NO branch to a step 58.

In the step 56, with the condition being satisfied, the procedure changes the filter strength from the level "M" to the level "S" at t=t1 as shown in FIG. 3C. Once the filter strength is set to the level "S" the filter strength does not change unless another condition is satisfied. In FIG. 3C the filter strength remains at the level "S" between t=t1 and t=t4.

In the step 58, with the condition being not satisfied, the procedure maintains the level "M" which is the default level for the filter strength.

Proceeding to a step 60, the procedure determines if the difference A is negative and if the absolute value of the difference Δ is greater than a threshold value T(SM). In one embodiment, the threshold value T(SM) is an integer value, for example, five (e.g., abs (Δ2)>5). If the condition is satisfied, the procedure proceeds along the YES branch to a step 64. If the condition is not satisfied, the procedure proceeds along the NO branch to a step 62. As indicated in the step 62, the procedure maintains the filter strength at the level "S."

In the step 64, with the condition of step 60 being satisfied, the procedure changes the filter strength from the level "S" to the level "M" at t=t4 as shown in FIG. 3C. Once the filter strength is set to the level "M" the filter strength does not change unless another condition is satisfied. In FIG. 3C the filter strength remains at the level "M" between t=t4 and t=t5.

Proceeding to a step 66, with the filter strength being at the level "M" the procedure determines if the difference Δ is negative and if the absolute value of the difference Δ is greater than a threshold value T(MW). In one embodiment, the threshold value T(MW) is an integer value, for example, ten (e.g., abs (Δ3)>10). If the condition is satisfied, the procedure proceeds along the YES branch to a step 70. If the condition is not satisfied, the procedure proceeds along the NO branch to a step 68. As indicated in the step 68, the procedure maintains the filter strength at the level "M."

In the step 70, with the condition of step 66 being satisfied, the procedure changes the filter strength from the level "M" to the level "W" at t=t5 as shown in FIG. 3C. Once the filter strength is set to the level "W" the filter strength does not change unless another condition is satisfied. In FIG. 3C the filter strength remains at the level "W" between t=t5 and t=t7.

Proceeding to a step 72, with the filter strength being at the level "W" the procedure determines if the difference Δ is positive and if the difference Δ is greater than a threshold value T(WM). In one embodiment, the threshold value T(WM) is an integer value, for example, three (e.g., Δ4>3). If the condition is satisfied, the procedure proceeds along the YES branch to a step 76. If the condition is not satisfied, the procedure proceeds along the NO branch to a step 74. As indicated in the step 74, the procedure maintains the filter strength at the level "W."

In the step 76, with the condition of the step 72 being satisfied, the procedure changes the filter strength from the level "W" to the level "M" at t=t7 as shown in FIG. 3C. Once the filter strength is set to the level "M" the filter strength does not change unless one of the conditions is satisfied. In FIG. 3C the filter strength remains at the level "M" between t=t7 and t=t9. At t=t9, the procedure changes the filter strength to the level "W" as described with reference to the step 66.

Proceeding to a step 78, the procedure determines whether the sequence of frames has ended (end of sequence "EOS"). If the sequence has not yet ended, the procedure returns along the NO branch to the step 54. Otherwise, the procedure ends at a step 80.

The video compression system 1 and the method of filtering in accordance with the present invention provide for a reduction of mosquito artifacts and blocking artifacts without distorting the pictures of the a video output sequence 10 so that the video movie as a whole is visually more pleasing for the viewers' eyes.

Furthermore, the postfilter module 20 is configured to implement a hysteresis for the levels of the filter strength. That is, the filter strength changes from the level "M" to the level "S" at t=t1 when the differences $\Delta 1$ is positive and greater than the threshold value T(MS), but returns to the level "M" when a different condition is satisfied, namely that the difference $\Delta 2$ is negative and the absolute value of $\Delta 2$ is greater than the threshold value T(SM). Such a hysteresis avoids that the filter strength changes if the motion activity changes only briefly.

Those skilled in the art will appreciate that the threshold values and threshold numbers referred to above are of exemplary nature. Different threshold values and threshold numbers may be used to, for example, modify the hysteresis of the postfilter module 20.

While the above detailed description has shown, described and identified several novel features of the invention as applied to a preferred embodiment, it will be understood that various omissions, substitutions and changes in the form and details of the described embodiments may be made by those skilled in the art without departing from the spirit of the invention. Accordingly, the scope of the invention should not be limited to the foregoing discussion, but should be defined by the appended claims.

What is claimed is:

1. A decoder apparatus for a video compression and decompression system, comprising:
   an input to receive an encoded video sequence;
   an output operative to transmit a decoded video sequence;
   a video decoder coupled with the input and configured to decode the received encoded video sequence into a decoded video sequence that contains compression artifacts; and
   a filter module coupled with the video decoder and the output, said filter module configured to filter the compression artifacts in the decoded video sequence, the filter module that is configured to filter the compression artifacts having a variable filter strength that is a function of the notion activity within the video sequence, wherein the filter module includes an activity counter configured to categorize each frame of the decoded video sequence as a first activity frame or as a second activity frame.

2. The decoder apparatus of claim 1, wherein the activity counter increases a first counter value for each high activity frame and decreases the first counter value for each low activity frame.

3. The decoder apparatus of claim 2, wherein the activity counter decreases a second counter value for each high activity frame and increases the second counter value for each low activity frame.

4. The decoder apparatus of claim 3, wherein the activity counter determines a difference between the first counter value and the second counter value.

5. The decoder apparatus of claim 4, wherein the filter module includes a threshold detector configured to compare the difference with at least one predetermined threshold value and configured to generate a control signal to adjust the filter strength.

6. The decoder apparatus of claim 5, wherein the control signal adjusts the filter strength to one of a high level, a medium level and a weak level.

7. The decoder apparatus of claim 6, wherein the medium level is a default level.

8. A method of filtering a decoded video sequence in a video compression and decompression system, comprising:
   receiving a decoded video sequence containing compression artifacts;
   determining a motion activity of each frame of the decoded video sequence;
   categorizing each frame as a fame of high activity or as a frame of low activity based on the determined motion activity;
   adjusting a filter strength of a filter to remove compression artifacts within the decoded video sequence as a function of the determined motion activity;
   increasing a first counter value for each high activity frame and decreasing the first counter value for each low activity frame;
   decreasing a second counter value for each high activity frame and increasing the second counter value for each low activity frame;
   determining a difference between the first counter value and the second counter value.

9. The method of claim 8, further comprising:
   comparing the difference with at least one predetermined threshold value; and
   generating a control signal to adjust the filter strength.

10. The method of claim 9, wherein adjusting the filter strength includes selectively adjusting the filter strength to one of a number of predetermined levels.

11. The method of claim 9, wherein adjusting the filter strength includes selectively adjusting the filter strength to one of a high level, a medium level and a weak level.

12. The method of claim 11, wherein adjusting the filter strength includes adjusting the filter strength to the medium level is a default level.

13. The method of claim 12, further comprising adjusting the filter strength to the strong level if the difference is positive and if the difference is greater than a first threshold value.

14. The method of claim 13, further comprising resetting the filter strength to the medium level if the difference is negative and if an absolute value of the difference is greater than a second threshold value.

15. The method of claim 14, further comprising adjusting the filter strength to the weak level if the difference is negative and if an absolute value of the difference is greater than a third threshold value.

16. The method of claim 15, further comprising resetting the filter strength to the medium level if the difference is positive and if the difference is greater than a fourth threshold value.

17. A method comprising:

receiving an encoded video sequence;

decoding the received encoded video sequence into a decoded video sequence that contains compression artifacts;

categorizing each frame of the decoded video sequence as a first activity frame or as a second activity frame; and removing with a filter module the compression artifacts in the decoded video sequence the filter module having a variable filter strength being a function of the motion activity within the decoded video sequence.

18. The method of claim 17, wherein the category of the first activity frame is a high activity frame and the category of the second activity frame is a low activity frame.

19. The method as recited in claim 17 wherein each frame is categorized with the filter module.

* * * * *